United States Patent [19]
Deaton, Jr. et al.

[11] Patent Number: 5,790,553
[45] Date of Patent: Aug. 4, 1998

[54] SEAMLESS PEER-TO-PEER COMMUNICATIONS IN A LAYERED COMMUNICATIONS ARCHITECTURE

[75] Inventors: George Allen Deaton, Jr., Raleigh; David James Franse, Efland; Vicki Gentry Horton, Rougemont; Jeffrey James Lynch, Apex; R. John Potok, Cary; James Harold Ragsdale, Raleigh, all of N.C.; Charles Pierre Rheinart, Tourrettes-sur-Loup, France; C. Eric Williford, Research Triangle Park, N.C.

[73] Assignee: International Business Machines Corp., Armonk, N.Y.

[21] Appl. No.: 539,287

[22] Filed: Oct. 4, 1995

Related U.S. Application Data

[63] Continuation of Ser. No. 932,424, Aug. 19, 1992, abandoned.

[51] Int. Cl.⁶ ............................ H04J 3/24; G06F 13/00
[52] U.S. Cl. ........................ 370/466; 370/469; 370/903; 395/200.57; 395/200.6
[58] Field of Search ........................ 370/465, 466, 370/467, 469, 903; 395/285, 500, 800, 200.57, 200.59, 200.6, 200.67, 200.68, 200.75, 200.79, 200.8

[56] References Cited

U.S. PATENT DOCUMENTS

| | | |
|---|---|---|
| 4,827,411 | 5/1989 | Arrowood et al. .................... 364/300 |
| 4,941,089 | 7/1990 | Fischer ................................. 370/94.1 |
| 4,991,133 | 2/1991 | Davis et al. .......................... 370/94.1 |
| 5,124,984 | 6/1992 | Engel ................................... 370/94.1 |
| 5,187,708 | 2/1993 | Nakatani et al. .................... 370/94.1 |
| 5,224,098 | 6/1993 | Bird et al. ........................... 370/110.1 |
| 5,235,597 | 8/1993 | Himwich et al. .................... 370/110.1 |
| 5,245,608 | 9/1993 | Deaton, Jr. et al. .................. 370/94.1 |
| 5,278,834 | 1/1994 | Mazzola .............................. 370/94.1 |

OTHER PUBLICATIONS

"Information Processing System—Open Systems Interconnection—Basic Reference Model," *ISO International Standard 7498*, First edition, Oct. 15, 1984.

"Systems Network Architecture—Concepts and Products," *IBM Product Manual GC30-3072-3*, File No. GENL-30 (SNA), Fourth Edition, Oct. 1986.

*Primary Examiner*—Alpus H. Hsu
*Attorney, Agent, or Firm*—Jerry W. Herndon

[57] ABSTRACT

An improvement in the Open Systems Interconnection model in which Service Access Points can be established directly between peer entities in the same layer of a protocol stack. This direct seamless peer-to-peer communication is vastly superior to the use of a higher level relay function to set up and manage the communication path. In particular, setup messages are exchanged between the peer entities and a higher layer to create the Service Access Point between the peer entities. The setup and management capabilities are contained in each of the peer entities and hence no relay function is required after the peer Service Access Point, substantially speeding up the communication and reducing the management overhead.

12 Claims, 11 Drawing Sheets

OPEN SYSTEMS INTERCONNECTION REFERENCE MODEL
(PRIOR ART)

TYPICAL OSI SERVICE PROVISION
(PRIOR ART)

PEER COMMUNICATIONS IN AN OSI MODEL

TYPICAL PEER-TO-PEER SYSTEM STRUCTURE

GENERATE ACT_SAP.REQ MESSAGE
IN LAYER (N+1)

RECEIVE ACT_SAP.REQ MESSAGE IN LAYER (N)

INCOMING DATA PROCESSING IN LAYER (N-1)

RECEIVE INCOMING DATA MESSAGE
WITH CALL SETUP INFORMATION IN LAYER (N)

RECEIVE CM_SVCS.IND MESSAGE BY DIRECTORY SERVICE ENTITY IN LAYER (N+1)

RECEIVE CM_SVCS.RSP MESSAGE
BY NETWORK LAYER ENTITY IN LAYER (N)

CONFIRMATION OF PEER PSAP ESTABLISHMENT
IN LAYER (N)

ESTABLISH PROTOCOL CONNECTIVITY
BETWEEN PEER ENTITIES IN LAYER (N)

CONNECTIVITY SETUP DECISION BY
PROVIDER PEER ENTITY IN LAYER (N)

SETUP ACCEPTANCE BY USER
PEER ENTITY IN LAYER (N)

DATA PROCESSING IN DLC ENTITY IN LAYER (N-1)

PEER USER DATA PROCESSING IN LAYER (N)

PEER PROVIDER DATA PROCESSING IN LAYER (N)

DATA CONFIRMATION RECEIVED BY PEER PROVIDER

SEAMLESS PEER-TO-PEER COMMUNICATIONS IN A LAYERED COMMUNICATIONS ARCHITECTURE

This application is a continuation of application Ser. No. 07/932,424, filed Aug. 19, 1992 abandoned.

TECHNICAL FIELD

This invention relates to data communications networks and, more particularly, to communication between two peer network layer entities within a common computer host in a layered protocol data transmission architecture such as the Open Systems Interconnection (OSI) model.

BACKGROUND OF THE INVENTION

Modern data communication system architecture utilize a layered model in which the lowest layer interacts directly with the physical transmission media while successively higher layers of protocol perform higher level communication services. At the top of the layer protocols is a user application protocol which communicates directly with some final process or user. This layered approach isolates the functions performed at each level from the functions performed at a lower level, thereby permitting lower level functions to be performed in many different ways depending on the capabilities and requirements of the particular application or facilities available. That is, the layered protocols allow each layer to carry out its assigned functions and to deliver data or services to adjacent layers using protocols which are acceptable to those adjacent layers, independent of the specific implementation of the adjacent layer functions. One such layered protocol, is described as the Open Systems Interconnection (OSI) Reference Model and is disclosed in "Information Processing Systems-Open Systems Interconnection-Basic Reference Model," ISO International Standard 7498, First Edition, Oct. 15, 1984. An entity in such a layered system is an active element in a layer that interacts with other entities in the system. An entity is typically a process running on the host computer requiring communication with other processes running on the same computer or on host computers at other nodes of the system.

An entity exists within a communication layer and consists of a collection of associated processes in that layer. Entities that provide services associated with that layer are referred to as service provider entities and entities that use those provided services are referred to a service user entities. Typically, service user entities and service provider entities for any particular service exist in adjacent layers. The interactions between the protocol layers are thus known as service provision and service use. Entities in adjacent layers in the OSI model communicate with each other by an addressing capacity called, in OSI, a Service Access Point (SAP). Functions performed at the same layer in different data processing nodes of the system are considered to be peer functions and the levels are called peer levels. Typically, in the OSI model, peer layers at different nodes communicate with each other by establishing Service Access Points to higher layers in the same node and communicate by the relaying of information through these higher level layers. The overhead involved in establishing and utilizing these higher level access points is considerable.

More particularly, in the OSI layered model, a provider entity in layer (N) is typically attached to one or more SAPs which, in turn, are attached to user entities in layer (N+1). The provider entity in layer (N) routes incoming blocks of information from lower layer (N−1) to the appropriate user entity in layer (N+1) for whom the information blocks are intended. Such blocks of information are called Protocol Information Blocks (PIBs) because they have been received over a communications medium and conform to the OSI protocols set for those layers. Protocol Information Blocks, in turn, can by further classified as Protocol Control Blocks (PCBs), the contents of which are used to manage the connection, and Protocol Data Blocks (PDBs) the contents of which are used to transport data to be delivered to the next higher layer.

In accordance with the OSI model, in order to route Protocol Information Blocks between entities in adjacent layers, a Service Access Point identifier (SAP.ID) is included in the PIB header. The PIB is sent to the SAP having the header SAP.ID and, through the SAP, to the appropriate user entity in the next higher protocol layer which is also attached to that SAP. Service entities in each layer (N) thus use the SAP.IDs in PIB headers to route the PIBs to the correct user entity in layer (N+1). To communicate between two peer entities in layer (N) within the same node, the OSI model uses an intermediate relay function in layer (N+1). That is, the relay service entity in layer (N+1) receives incoming PIBs from a layer (N) provider entity and performs setup PIB routing and management of the connection between the layer (N) peer entities throughout the duration of the peer entity communication. This third party interaction on a data block by data block basis by the layer (N+1) intermediate relay entity is a costly overhead for the system to absorb during peer-to-peer communications and reduces the overall throughput of the system. Efficient, high-performance communications services become more difficult to maintain in the face of such high overheads.

A further description of the OSI architecture and the details of inter-layer communications is disclosed in the copending application Ser. No. 07/588,214, filed Sep. 26, 1990, and assigned to applicants' assignee, now U.S. Pat. No. 5,245,608, C. R. Pond et al, entitled A METHOD FOR GROUPING SERVICE ACCESS POINTS BETWEEN COMMUNICATION ENTITIES.

SUMMARY OF THE INVENTION

In accordance with the illustrative embodiment of the present invention, the basic addressing mechanisms described in the Open Systems Interconnection reference model are expanded to handle communications between peer entities in the same layer within a single node. That is, each such peer entity becomes a service provider for the other peer entity as a service user. The Service Access Point concept is expanded to permit common connection of peer entities to a single SAP within a layer without the use of a relay service in the next higher layer to provide the setup and management functions. Instead, the intelligence and control mechanisms are contained within the peer entities themselves. The connectivity is therefore established directly between the peer entities themselves, substantially reducing the connection overhead. For convenience, these new peer-to-peer SAPs are called Peer Service Access Points (PSAPs) to distinguish them from the prior art SAPs.

A peer-to-peer connection is initiated by the reception of a Protocol Information Block (PIB) calling for the setup of the connection and containing all of the setup information. When the call setup message is received by a layer N entity, the entity extracts the network PSAP.ID address contained in the header of the PIB. This entity initially becomes the layer N user entity. The PSAP.ID address is in the same form as that described in ISO Document 8348, Addendum 2, for prior art SAP.IDs. The user entity sends the PSAP address to a Directory Service management entity, along with the originating entity's type and the originator's access method. This information allows the Directory Service entity to determine where the call should be routed and to determine is the call should be forwarded, that is, whether facilities are available to handle the call.

The Directory Service entity returns the peer entity identifier to the user entity to indicate where the PIB should be routed. The user entity uses this peer entity identifier to determine whether or not an PSAP has been established between itself and the provider entity in the same layer. If one does not already exist, an PSAP is activated by sending an activate PSAP message to the target (provider) entity, requesting that an PSAP be established. The PSAP message contains the user's identification. (PSAP.ID) for this PSAP and requests that a response be returned. The provider entity retains the PSAP's identification and other information about the PSAP needed for managing the PSAP. This provider entity then returns a confirm message containing the PSAP.ID to the originating peer user entity.

Once the PSAP exists, connectivity can be established between the two peer network layer entities. This is accomplished by passing the PIB, or protocol-specific information, from the PIB to the provider entity. The provider entity decides from this information whether or not to accept the call and how to route the PIB to its final destination, which may be within or external to this node. A confirm message is then returned to the user indicating the status of the call and containing a PIB to be returned to the entity originator of the call indicating acceptance or rejection of the call.

Once the call is established by the above procedure, data can flow seamlessly between the two layer N entities with no need for interaction with a higher level. The data itself may need to be transformed to meet the data format required by the other peer entity, or the two peer entities can initially negotiate the data format and eliminate the data transformation step. If no data transformation is needed, the performance of the seamless peer-to-peer communication of the present invention is far superior to the third party relay function used in the OSI reference model.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION OF THE DRAWINGS

Figure 1:
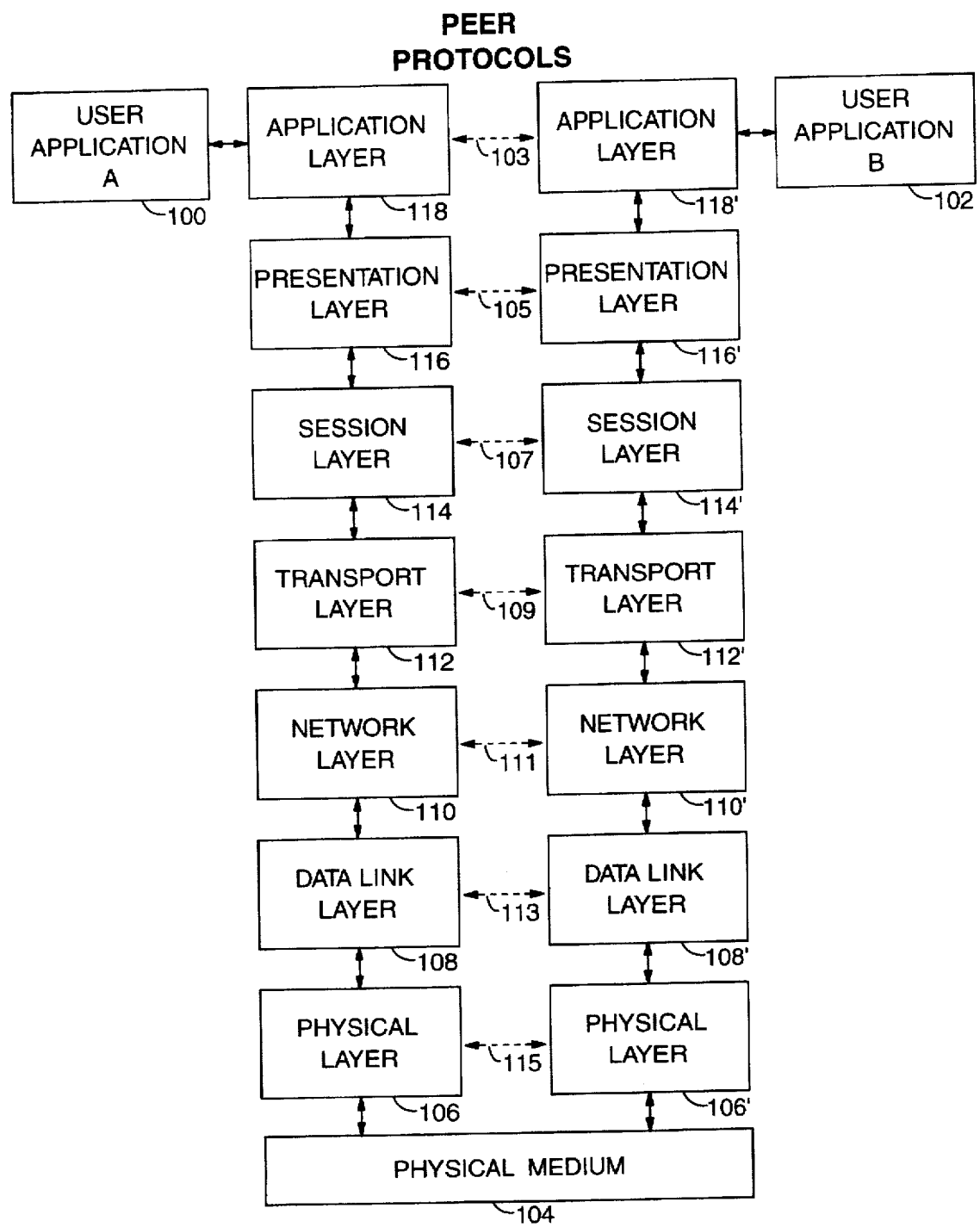
FIG. 1 shows a general block diagram of the Open Systems Interconnect (OSI) Reference Model for a layered communication architecture in which the present invention may find use.

In FIG. 1 there is shown a general block diagram of a packet communications system utilizing the Open Systems Interconnection (OSI) model disclosed in "Information Processing Systems-Open Systems Interconnection-Basic Reference Model," ISO International Standard 7498, First Edition, Oct. 15, 1984. As can be seen in FIG. 1, communication between two different users 100 and 102, located at two different nodes of a packet communications network, involves the use of up to seven layers of protocol, each isolated from the others but meeting an interface standard allowing each layer to communicate with the adjacent layers. This layered approach permits the implementation of the individual layers to be flexible while at the same time providing the same standard functionality and insuring that inter-layer communications can take place. Communication between users 100 and 102 is thus made possible by communication between the seven layers of the OSI model, observing the inter-layer protocols.

The bottom or lowest layer, called the physical layer and represented by boxes 106 and 106', provides actual connections across physical medium 104 between the two communication nodes. Such physical connections are made by way of electrical signals propagating on the physical medium between the two systems in accordance with any of the well known transmission protocols. These physical layer transmission protocols define the signal pulse shapes, pulse repetition rates, pulse amplitudes, and so forth. The next higher layer, that data link control (DLC) layer, represented by boxes 108 and 108', controls the delivery of raw data between the nodes in the network. The DLC layer protocols include link identification, synchronization, error correction, packet sizes, framing, and so forth. In most networks, fundamental communication errors are detected and corrected at the data link control layer by means of data retransmission or logical data manipulation for error recovery.

The next higher protocol layer above the data link control layer is called the network layer, represented by boxes 110 and 110' in FIG. 1. The network layer is the highest layer of the communications network node or subnode, meaning that all layers above this layer communicate on an end-to-end basis, while the network layer (and all layers below the network layer) control communications between nodes of the network. The network layer protocols control the routing of information through the network, packet addressing, network initialization, packet switching, as well as segmenting and formatting of the information. For example, the network layer function can be realized by using an international communications standard which prescribes an interface between a public packet-switched network and a communications system such as the standard, defined in CCITT Recommendation X.25, which prescribes the details of a packet-switched protocol to perform all of the network layer functions. A network layer implementation utilizing this X.25 protocol will hereinafter be referred to as a packet level control (PLC) entity. Other network layer implementations are, of course, possible, but will not be described or further referred to here.

The next higher protocol layer above the network layer is called the transport layer and is represented by boxes 112 and 112' in FIG. 1. Transport layers 112 and 112' control the transparent data transfer, end-to-end control, multiplexing, data mapping, and so forth. Data delivery to the transport layer may, for example, imply reliable data reception or may imply only best efforts to deliver the data. Indeed, classes of reliability and delivery options may be selected at will by the user. For example, the highest reliability class could mean that the data will be transferred in a reliable manner and that all errors occurring at lower layers will be corrected at or below the transport layer. Lower classes of reliability could imply best efforts to deliver the data, the deletion of erroneous data or simply the delivery of data regardless of error.

The next higher protocol layer above the transport layer is called the session layer and is represented by boxes 114 and 114' in FIG. 1. The session layer protocols group pieces of information received from the transport layer into multipacket groups associated with a given logical layer activity which can be referred to as a session. Sessions can exist between any two entities at any location in the network. Indeed, at any given time, a single node in the network can be involved in multiple sessions going to many other nodes, and many sessions can be multiplexed over the same network links. The session layer provides end-to-end coordinated delivery of data to a given logical activity without interference by data from other logical activities, even at the same layer of the same system.

The next higher protocol layer above the session layer is called the presentation layer and is represented by boxes 116 and 116' in FIG. 1. The presentation layer protocols interface the session layer to the application layer, presenting data to the application layer in a format suitable for use by the application layer without compromising the integrity of the session layer functions. The presentation layer provides data interpretation, format and code translation. The highest layer, the application layer, represented by boxes 118 and 118' in FIG. 1, provides the interface to the user applications 100 and 102 and to system management functions above the highest communications layer.

In layered communications architectures such as that illustrated in FIG. 1, each layer typically interacts only with adjacent layers since the protocols are defined only for adjacent inter-layer interfaces. It may be desirable, however to communicate between peer entities in the same layers of different nodes of the communications system, as suggested by the dashed arrows 103, 105, 107, 109, 111, 113 and 115 of FIG. 1. The present invention is concerned with improved techniques for such peer-to-peer communications in layered communications architectures such as that shown in FIG. 1.

Figure 2:
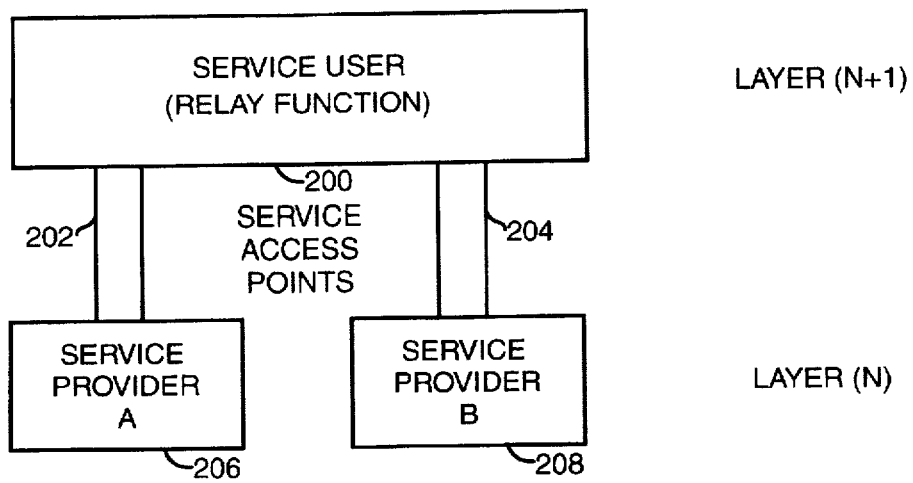
FIG. 2 shows a general block diagram of a typical prior art Open Systems Interconnect architecture for communication between services users and services providers.

In FIG. 2 there is shown the mechanism used in the OSI reference model for communications between two peer service providers 206 and 208 in layer (N). In order to transfer data between the two peer service providers 206 and 208, it is necessary to utilize a common service user entity 200. That is, each service provider entity 206 and 208 must separately and independently establish communication with service user entity 200 by way of service access point (SAPs) 202 and 204, respectively. Only after such communication is established can the peer user entities communicate with each other, and then only by having the common user entity 200 relay the data from one service provider entity to the other. This communications technique is slow and awkward, requiring large amounts of overhead in both setting up the connection and in relaying each block of data.

In accordance with the present invention, means are provided for peer entities in a layered architecture communications system to establish direct communications with each other rather than through a higher layer of the system. In particular, in FIG. 3, a packet network (now shown) is connected to the physical media 319. The lowest protocol layer is represented by physical layer entities 317 and 318, at layer (N−2), which interacts with the physical media 319. Immediately above the physical layer entities 317 and 318 are the data link layer entities 314 and 316 at layer (N−1) are shown connected to network layer entities 304 and 306, respectively, at layer (N) through service access points 310 and 312, respectively. It is the layer (N) network entities 304 and 306 which are the peer entities to be connected together, corresponding to entities 206 and 208 in FIG. 2. In order to receive management functions from a higher layer directory services entity 300 at layer (N+1), network layer entity 304 is connected to directory services entity 300 through a standard OSI service access point 302. In accordance with the present invention, the prior art OSI definition of a service access point, usually restricted to connections between adjacent layers in a single node, is expanded to include a direct peer entity connection between peer entities in the same layer. Thus, in FIG. 3, a peer network service access point (PSAP) 308 is established directly between network layer entities 304 and 306, without the necessity of relays through higher level layers. That is, each of the peer entities 304 and 306 acts as both a user of services (provided by the other peer entity) and a provider of services (used by the other peer entity). Moreover, each of peer layer entities 304 and 306 is provided with sufficient call establishment and call maintenance capability so as to avoid the need for an outside connection management capability, such as was provided by the higher level relay entity in the OSI model. It is to be understood, however, that peer interconnections through PSAPs can be accommodated between any other peer entities in the layered protocol packet communications architecture.

Figure 4:
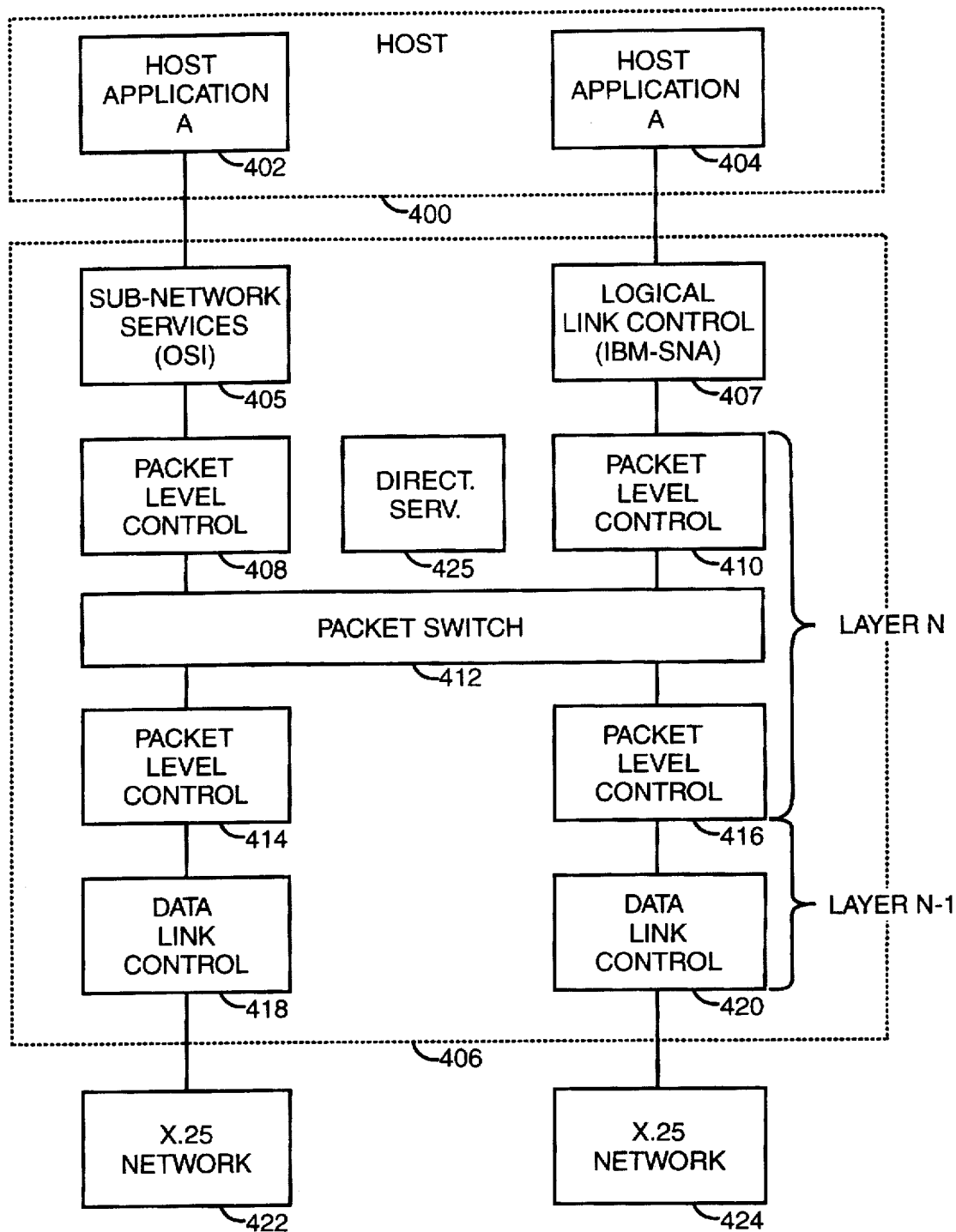
FIG. 4 shows a detailed block diagram of an exemplary peer-to-peer system structure in a layered communications system utilizing the principles of the present invention.

In FIG. 4 there is shown a detailed block diagram of one physical structure in which a peer-to-peer communications can be set up in accordance with the present invention for providing seamless peer-to-peer communications in layered communications systems. For the purposes of illustration, the left-hand boxes in FIG. 4 represent the layers of a system structured after the Open Systems Interconnect (OSI) model while the right-hand boxes represent the layers of the International Business Machines Systems Network Architecture (SNA) system. The SNA architecture is described in "Systems Network Architecture-Concepts and Products," IBM Product Manual GC30-3072-3, Fourth Edition, October 1986. A communications system 406 contains a switch 412 which represents the Peer SAP that enables the switching of Protocol Information Blocks (PIBs) between the various packet level control (PLC) entities connected to switch 412. For example, switch 412 might comprise a common bus onto which PIBs are gated by a sending entity and simultaneously gated off to a receiving entity. In any event, switch 412 performs the functions of peer SAPs switching PIBs between a plurality of connected packet level control entities 408, 410, 414 and 416, belonging to both the OSI system and the SNA system.

Assume that a host 400 contains two host applications 402 and 404, one using the OSI architecture and the other using the SNA architecture, which applications are capable of simultaneously establishing connectivity through X.25 network layers 414 and 410. The detailed procedures necessary to set up and maintain connectivity between the two peer entities, will be described below.

Figure 3:
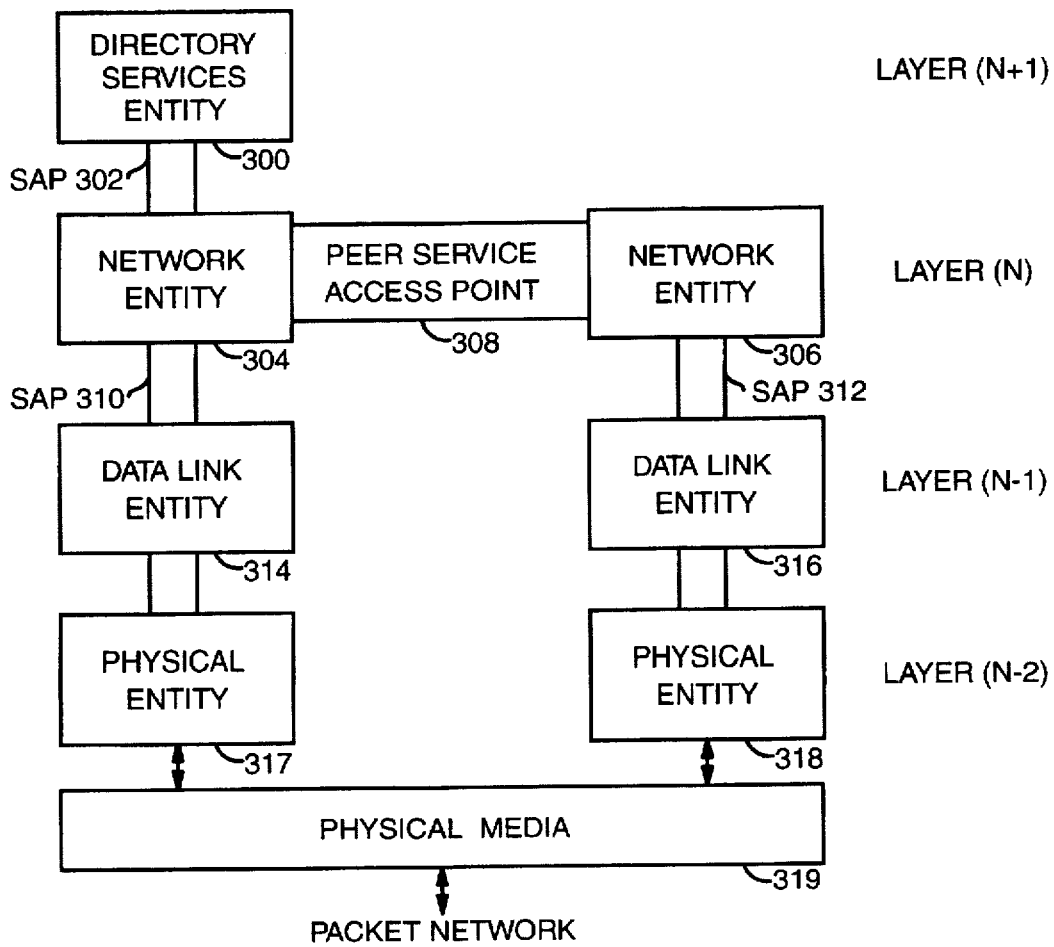
FIG. 3 shows a general block diagram of typical peer communications in an Open Systems Interconnect architecture in accordance with the present invention.

Although not illustrated in FIG. 3, a typical implementation of the Peer SAP, between two peer either in the same layer requires the use of a packet switching capability such as switching function 412 of FIG. 4 located in the node of the packet communications network in which peer-to-peer communications is to take place. There are four peer packet level control entities 408, 410, 414 and 416 illustrated in FIG. 4. By the use of the present invention, peer SAPs may be established thus allowing information to be moved seamlessly, without the use of a higher layer relay function, between any two of the peer packet level entities 408, 410, 414 and 416. These peer level interconnections make use of the packet switch 412 in establishing the Peer SAP between peer entities. For example, upon receipt of a call from the X.25 network 422, requesting a peer level connection between two of the packet level entities 408, 410, 414 or 416, data link control entity 418 formats a data indication message called a "DATA.IND" message requesting the required PSAP connection and sends the DATA.IND message to the packet level control entity 414. The packet level control entity 414, in turn, extracts the service access point (SAP) address of the called peer packet level control entity from this message and uses it to formulate a request for directory services in a connection management services indication message called a "CMSVCS.IND" message and sends the CM.SVCS.IND message to the directory services entity 425, using packet switch 412.

The directory services entity 425 includes peer identity addressing information and uses that information to determine that the CMSVCS.IND message includes a SAP.ID which identifies one of the peer packet level control entities 408, 410, 414 or 416 connected to switch 412. If a connected entity is properly identified, the directory services entity 425 returns the address of the identified peer entity (in this case, packet level control entity 410, for example) to the packet level control entity 414. PLC entity 414 then sends an activate service access point request message for a peer connection (called an "ACTSAP.REQ" message) to the identified peer PLC entity 410. PLC entity 410 either accepts or rejects the call and returns an activate service access confirm message (called a "ACTSAP.CNF" message) through packet switch 412 to PLC entity 414, thereby establishing the peer PSAP. PLC entity 414 then establishes the desired inter-communication peer protocol by means of a open fast path peer connection request message ("OPENFP.REQ") sent to PLC entity 410, responded to by PLC entity 414 confirmation in an open fast path peer connection confirm ("OPENFP.CNF") message. When the OPENFP.CNF message is received at PLC entity 414, entity 414 issues a data request message, called a "DATA.REQ" message, for transmission, via data link control 418 over X.25 network 422 back to the originating entity containing the call status information. This DATA.REQmessage indicates to the originating entity that the seamless peer-to-peer communications path is now open and available. This path can now be used for all subsequent data flow from the X.25 network 422 to the PLC entity 410 without the intervention of any relay functions in any higher layer entities.

This procedure for establishing seamless peer-to-peer communication between peer entities will be described in more detail in connection with the balance of the figures. In order to maintain generality, the remaining figures, FIGS. 5 through 18, will be described in connection with the more general block diagram of FIG. 3. The application of these procedures to the detailed example of FIG. 4 will be obvious to any person of ordinary skill in the packet communications art.

Figure 5:
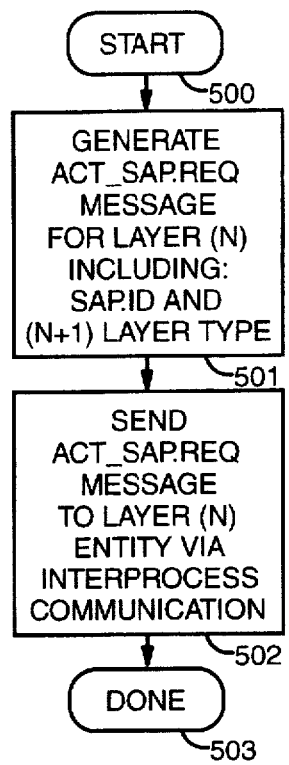
FIG. 5 shows a flow chart for establishing a Service Access Point to a first peer entity in Layer (N) of a layered communications system.

Starting with FIG. 5, there is shown a detailed flow chart of the action necessary to initiate peer communications between two entities in the same layer, layer (N). The first action is for a user entity in layer (N+1) to request a service from an entity in layer (N). Thus, a user entity in layer (N+1) initiates the creation of an access to layer (N) by requesting a Service Access Point (SAP) to a service provider entity in layer (N+1). That is, in FIG. 3 the SAPs 302, 310 and 312 are established by the prior art techniques. In the flow chart of FIG. 5, starting at start box 500, the layer (N+1) user entity generates an ACTSAP.REQ message in box 501, including the identification (SAP.ID) by which it will recognize the Service Access Point when it is established, and the entity type of the initiating (N+1) entity. In box 502, the ACTSAP.REQ message is sent to the layer (N) service provider entity, using standard interprocess communications techniques. The message initiating process of FIG. 5 is then terminated in box 503.

Figure 6:
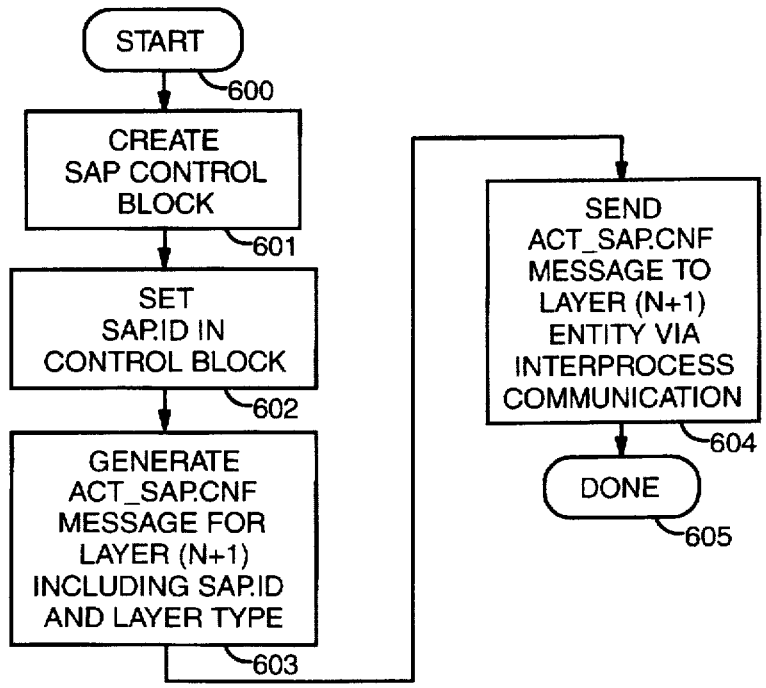
FIG. 6 shows a flow chart for confirming the establishment of the Service Access Point in Layer (N) of a layered communications system established in FIG. 5.

In FIG. 6 there is shown a flow chart of the reception of the ACTSAP.REQ message transmitted in FIG. 5. Starting in start box 600, the service provider entity in layer (N) receives the ACTSAP.REQ message and, in box 601, creates a Service Access Point including a control block corresponding to the received request in the ACTSAP.REQ message. In box 602, the received SAP.ID is set into the control block to identify this control block with the request from the user in layer (N+1). In box 603, a confirmation message to confirm the reception of the ACTSAP.REQ message and including the local SAP.ID and the layer type of the service provider entity. This ACTSAP.CNF message is returned, via standard interprocess communications, in box 604, to the user entity in layer (N+1) which originated the ACTSAP.REQ message, confirming the creation of the SAP preparatory to communication with the service provider entity in layer (N+1). In FIG. 3, the (N+1) layer entity 300 sends the ACTSAP.REQ message to layer (N) network entity 304 which creates the control block and returns an ACTSAP.CNF message back to entity 300, thus creating SAP 302. The process described in the flow charts of FIGS. 5 and 6 are repeated to establish SAPs 310 and 312 between layer (N) network entities 304 and 306 and layer (N−1) data link entities 314 and 316, respectively.

Once a Service Access Point is activated as shown in FIGS. 5 and 6, the protocols necessary to establish connectivity with the layer (N) entity must be established. It will be assumed for this example that the service provider entity is a data link control (DLC) entity and that OSI DLC layer protocols will be used. Since this protocol is part of the OSI standard, it will not be further described here. It will be assumed, however, that data link control connectivity has been established and that Protocol Information Blocks (PIBs) can now be received by the DLC from a peer data link control entity in another node. In FIG. 3, for example, PIBs can be received from the packet network via the physical media 319, the physical layer entity 317 and the data link entity 314.

Figure 7:
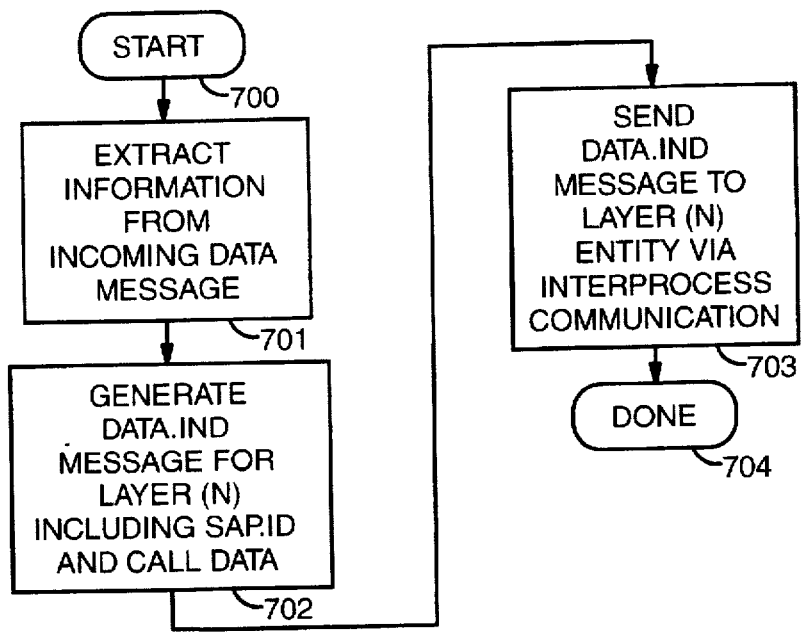
FIG. 7 shows a flow chart of the reception and processing of incoming call setup data elements in an entity in Layer (N-1) of a layered communications system.

In FIG. 7 there is shown a flow chart of the reception in the layer N entity of a PIB call setup message from a peer data link control entity in another node. Starting in start block 700, the information in the call setup PIB is extracted from the incoming PIB data message in block 701. In box 702, the receiving DLC entity in layer (N−1) generates a DATA.IND message to pass the received information on to the adjacent layer (N) network entity. In box 703 this message is sent to the layer (N) entity using the standard interprocess communications facility. The process of FIG. 7 then terminates in box 704. Relating this to FIG. 3, the layer (N−1) DLC entity 314 receives information from the packet network and passes it, via SAP 310, to layer N network entity 304 in a DATA.IND message.

Figure 8:
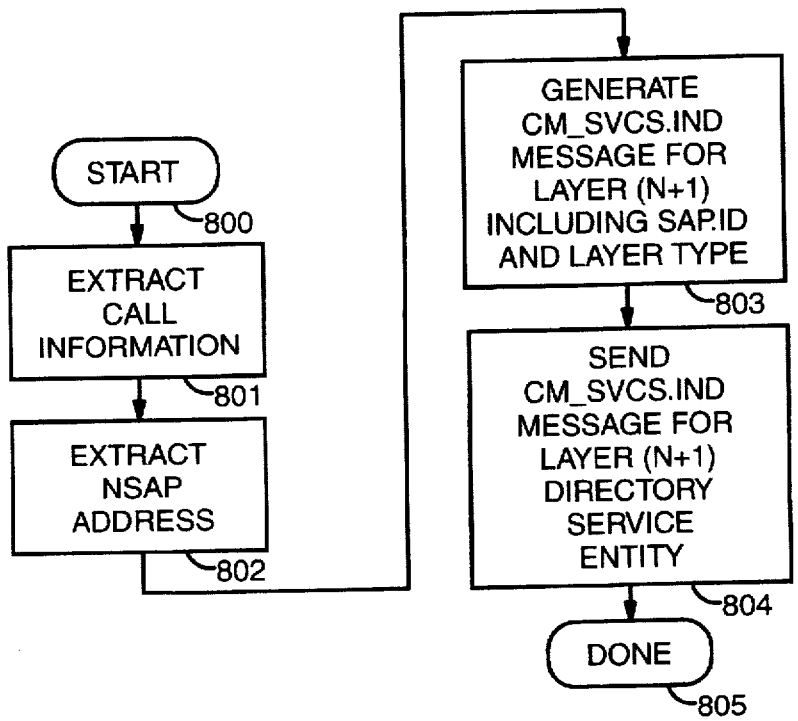
FIG. 8 shows a flow chart of the reception and processing of an incoming call set up message in a network entity in layer (N) of a layered communications system.

Meanwhile, as will be shown in the flow chart of FIG. 8, the receiving entity begins processing the call setup message. In FIG. 8 there is shown a flow chart of the call setup processing taking place in the network entity in layer (N). Starting in box 800, box 801 is entered to extract all of the call information from the call setup message. The information in this message includes a Network System Access Point (NSAP) identification (NSAP.ID) which is extracted from the call information in box 802. The layer (N) network entity then generates a CMSVCS.IND message to be forwarded to the layer (N+1) Directory Services entity to verify call parameters. This CMSVCS.IND message in sent in box 804 to the layer (N+1) Directory Service entity. That is, in FIG. 3, the layer (N) network entity 304 generates a CMSVCS.IND message for the layer (N+1) directory entity 300 which is sent via SAP 302 to entity 300.

Figure 9:
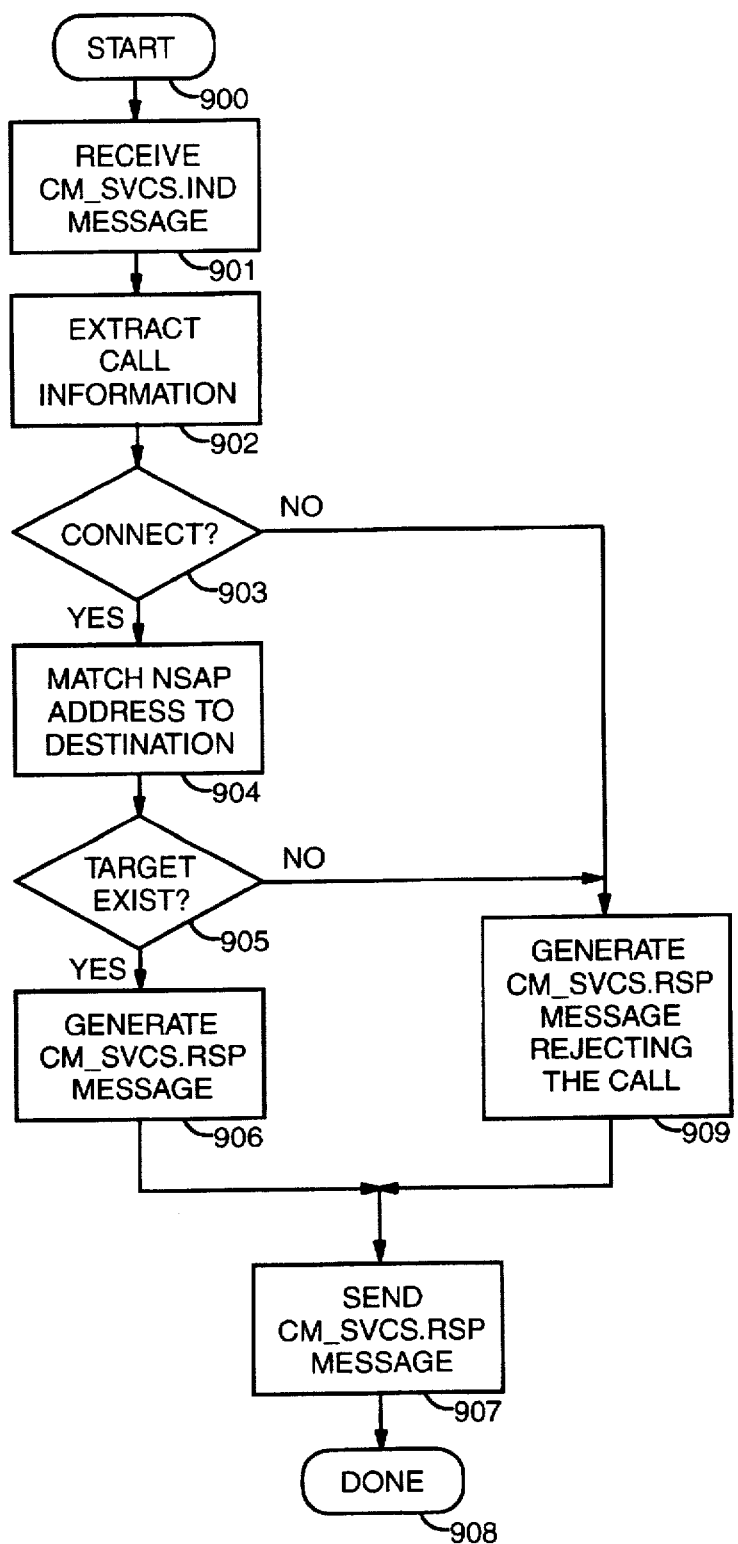
FIG. 9 shows a flow chart of the reception and processing of a call by a directory service entity in Layer (N+1) of a layered communications system identifying whether the call is allowed and the identification of the target entity.

In FIG. 9 there is shown a flow chart of the processing of the CMSVCS.IND message in the layer (N+1) Directory Services entity. Starting in start box 900, box 901 is entered where the CMSVCS.IND message is received in the directory services entity. In box 902 the call setup information is extracted from the CMSVCS.IND message. In decision box 903, it is determined whether or not this type of call is allowed, based on the originating and target entities types and identifications. If the connection is permitted, box 904 is entered to match the NSAP address in the message to the destination, peer entity, of the call. If they match and the target peer entity therefore exists, box 906 is entered to generate a favorable response to the CMSVCS.IND message called a CMSVCS.RSP message. In box 907, this CMSVCS.RSP message accepting the call is sent to the layer (N) network entity requesting call processing. If the connection is not permitted, as determined by decision box 903, or is there is no properly identified target entity, as determined by decision box 905, then box 909 is entered to generate a CMSVCS.RSP message rejecting the call and specifying the reason the call cannot be completed. As before, this message is also returned to the layer (N) network entity. The process of FIG. 9 terminated in box 908. Relating the process of FIG. 9 to FIG. 3, the directory services entity 300 processes the CMSVCS.IND message and returns a CMSVCS.RSP message to layer (N) network entity 304 via SAP 302.

It will be noted that the designation of an entity as a user entity or a service provider entity in the OSI model depends only on their relative layer positions in the OSI reference model. Since peer entity interconnection, by definition, involves entities in the same layer positions, it is necessary to assign user and provider designations in accordance with a different rule. In accordance with the present invention, the peer entity which is initially stimulated to create the peer connection is arbitrarily assigned the user entity designation, and the other peer entity the provider designation. In accordance with the OSI model, these designations imply management and error handling responsibilities which will not be described here, but which are implemented in both peer entities, and are activated only as required to satisfy the designation requirements. The procedures for establishing a peer Service Access Point (PSAP) are described in connection with FIGS. 10 and 11.

Figure 10:
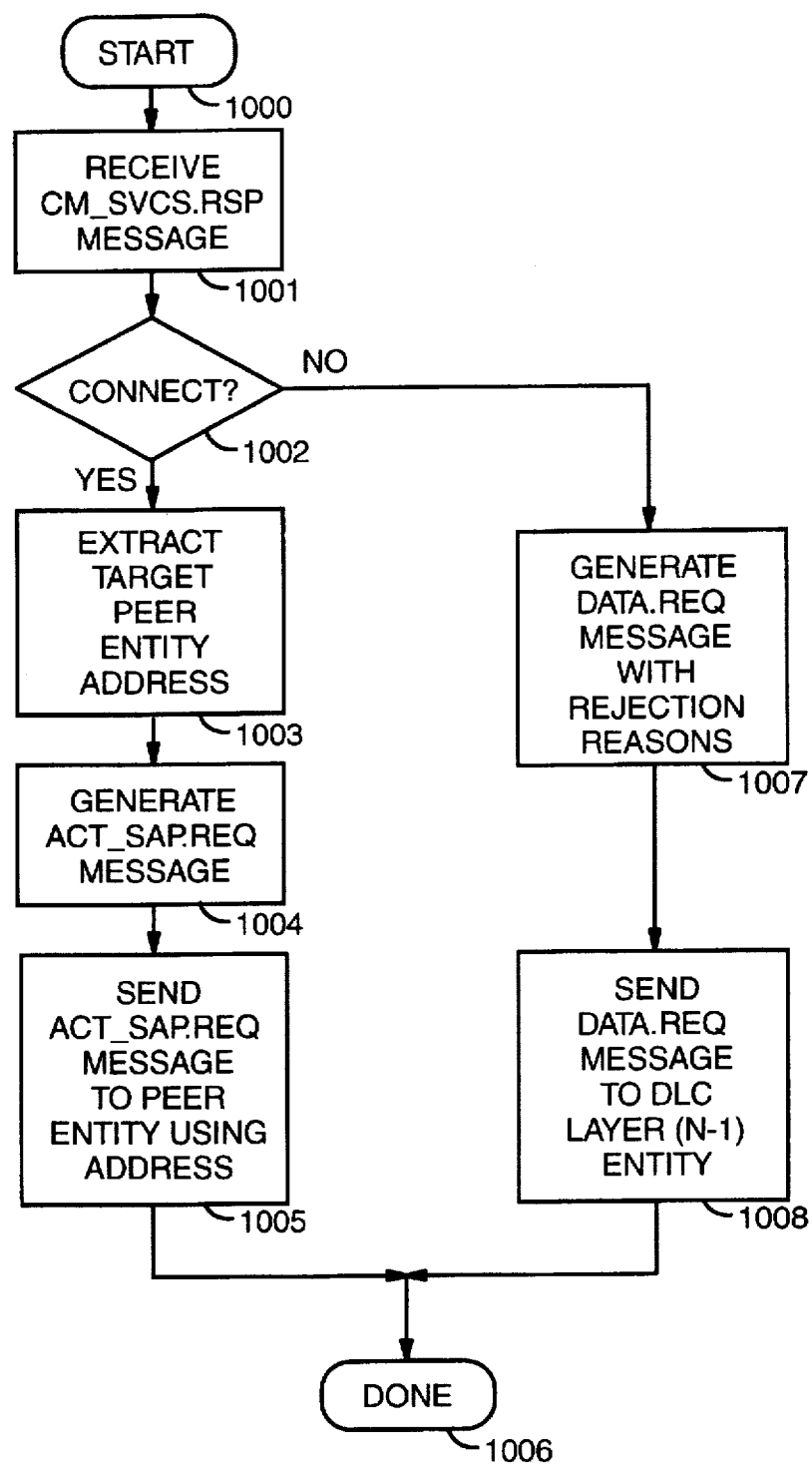
FIG. 10 shows a flow chart of the reception and processing of a call by a network layer entity in Layer (N) of a layered communications system identifying and establishing a Peer Service Access Point with the target entity.

In FIG. 10 there is shown a flow chart of the process which takes place in the layer (N) network entity when the CMSVCS.RSP message is received. Starting at start box 1000, box 1001 is entered in which the CMSVCS.RSP message is received in the layer (N) network entity. In decision box 1002, it is determined whether the call has been accepted or rejected by the Directory Services entity in FIG. 9. If the call has been rejected, box 1007 entered to generate a DATA.REQ message intended for the layer (N−1) DLC entity with the reasons for the rejection to be returned to the originating layer (N−1) DLC entity in box 1008. If the call has been accepted, box 1003 is entered to extract the target peer entity address from the CMSVCS.RSP message. Using the target entity address, in box 1004 an ACTSAP.REQ message is generated to open a Peer Service Access Point (PSAP) to the target entity. In box 1005, this ACTSAP.REQ message is sent to the target entity. In either case, the process of FIG. 10 terminates in box 1006.

Relating this procedure to FIG. 3, the directory services entity 300 sends a CMSVCS.RSP message via SAP 302 to layer (N) network entity 304. If the call is rejected, the layer (N) network entity 304 creates a DATA.REQ message to be forwarded to the layer (N−1) data link control entity 314 via SAP 310 for return via media 319 to the originating entity. If the connection is accepted, the layer (N) network entity 304 extracts the target address of the peer layer (N) network entity 306 and send an ACTSAP.REQ message to entity 306 to initiate the creation of the peer Service Access Point (PSAP).

Figure 11:
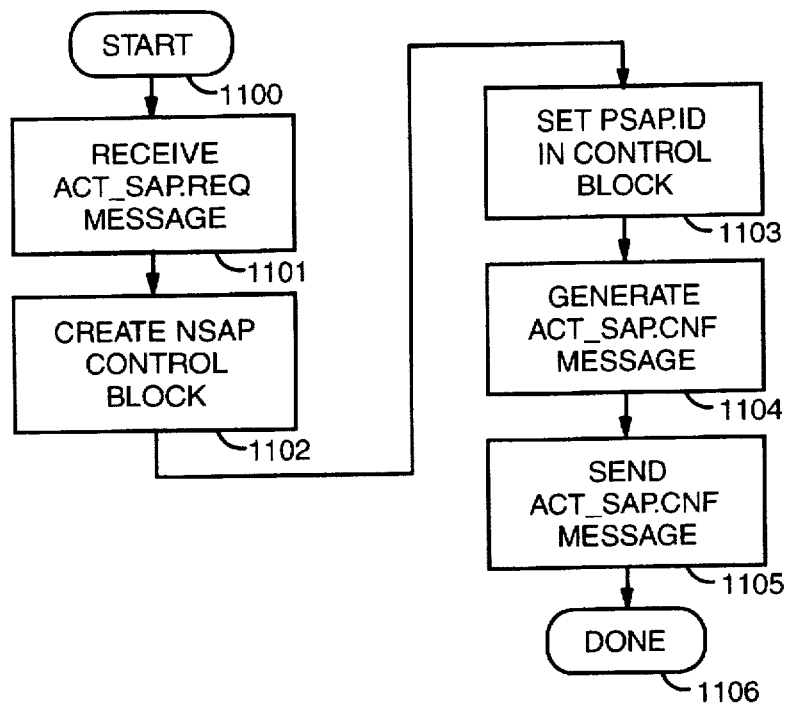
FIG. 11 shows a flow chart of the service provider entity in layer (N) accepting and processing a Peer Network Service Access Point establishment request from the flow chart of FIG. 10.

In FIG. 11 there is shown a flow chart of the process for confirming the establishment of the PSAP in the layer (N) entity. Starting in box 1100, box 1101 is entered where the ACTSAP.REQ message is received in the target peer entity. In box 1102, a PSAP control block is created in the target entity and, in box 1103, the PSAP.ID is set in the control block. In box 1104, an ACTSAP.CNF confirmation message is generated in the target entity and, in box 1105, the confirmation message is sent back to the initiating peer entity. The process of FIG. 11 terminates in box 1106. In FIG. 3, layer (N) network entity 306 creates an ACT-SAP.CNF message for return to the peer layer (N) network entity 304 and send the ACTSAP.CNF back to entity 304. This exchange of ACTSAP.REQ and ACTSAP.CNF messages establishes the peer Service Access Point (PSAP) 308 in FIG. 3.

Figure 12:
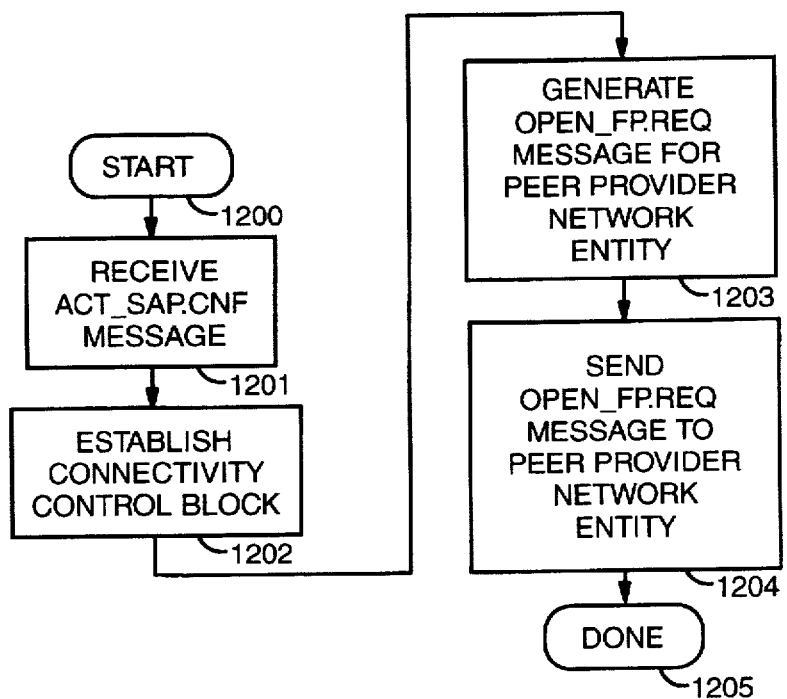
FIG. 12 shows a flow chart of the service user in the network layer entity in layer (N) establishing the protocol for connectivity with the service provider established in the flow chart of FIG. 11.

Now that the peer PSAP has been established, the user peer entity uses the original call setup information and packages it in a message which can be used to establish the protocols to be used in the connection. Station parameters such as packet parameters, window parameters and other related parameters can also be passed to fine-tune the performance of the peer connection. In FIG. 12 there is shown a flow chart of the establishment of protocol connectivity between the peer entities. Starting in box 1200, box 1201 is entered where the ACTSAP.CNF message generated in FIG. 11 is received at the initiating peer entity. In box 1202, the initiating entity also establishes a connectivity control block and, in box 1203, generates the protocol connectivity control message OPENFP.REQ to be sent to the target peer entity. Since there may be more than one protocol connection over the same PSAP, it is necessary that the OPENFP.REQ message include a protocol identification (FP.ID) which identifies this particular protocol connection and includes a set of station parameters. In box 1204, this message is sent to the target service provider peer entity. In FIG. 3, the layer (N) user network entity 304 sends an OPENFP.REQ message via PSAP 308 to the layer (N) peer network entity 306.

Figure 13:
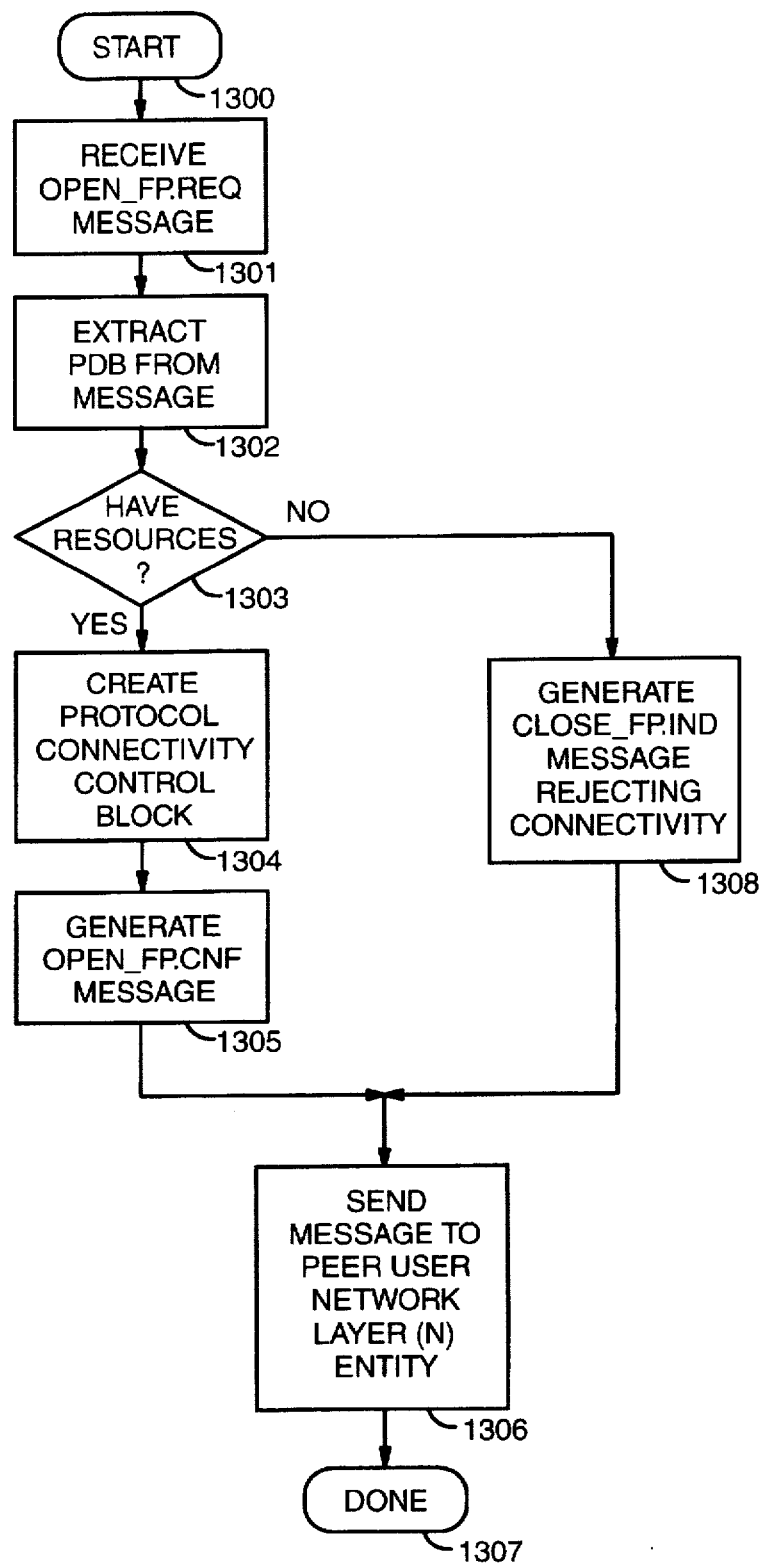
FIG. 13 shows a flow chart of the service provider in the network layer entity in layer (N) processing the connectivity request received from the flow chart of FIG. 12.

In FIG. 13 there is shown a flow chart of the process in the service provider peer entity when the protocol connectivity setting message is received from the service user peer entity which has initiated the peer connection. Starting in box 1300, box 1301 is entered where the OPENFP.REQ protocol message is received at the service provider peer entity. In box 1302 the Protocol Data Block (PDB) is extracted from the OPENFP.REQ message and, in decision box 1303, the service provider peer entity determines whether or not it has the resources available to accept the peer connection. If the service provider entity does not have the resources available 1308 is entered to generate a close fast path peer connection indication (CLOSEFP.IND) message rejecting the peer connection. The CLOSEFP.IND message contains the FP.ID identifier sent in the OPENFP.REQ message to identify the particular protocol connection and set of station parameters being closed. In box 1306 this rejection message is sent to the peer user entity and the process terminated in box 1307. In FIG. 3, if there are not enough resources available to create a protocol connection, the layer (N) network entity 306 sends a CLOSEFP.IND message to peer layer (N) network entity 304 via the PSAP 308. If, however, the service provider peer entity is determined to have the necessary resources in decision box 1303, box 1304 is entered to establish a protocol connectivity control block in the service provider peer entity. In box 1305, a OPENFP.CNF confirmation message is generated to confirm the establishment of the peer connection and, in box 1306, the confirmation message is sent to the service user peer entity. The process again terminates in box 1307. In FIG. 3, the layer (N) network entity 306 creates a protocol connectivity control block and sets the station parameters and FP.ID in the control block. The entity 306 then creates an OPENFP.CNF confirmation message for layer (N) peer network entity 304 and sends the OPENFP.CNF message via PSAP 308.

Figure 14:
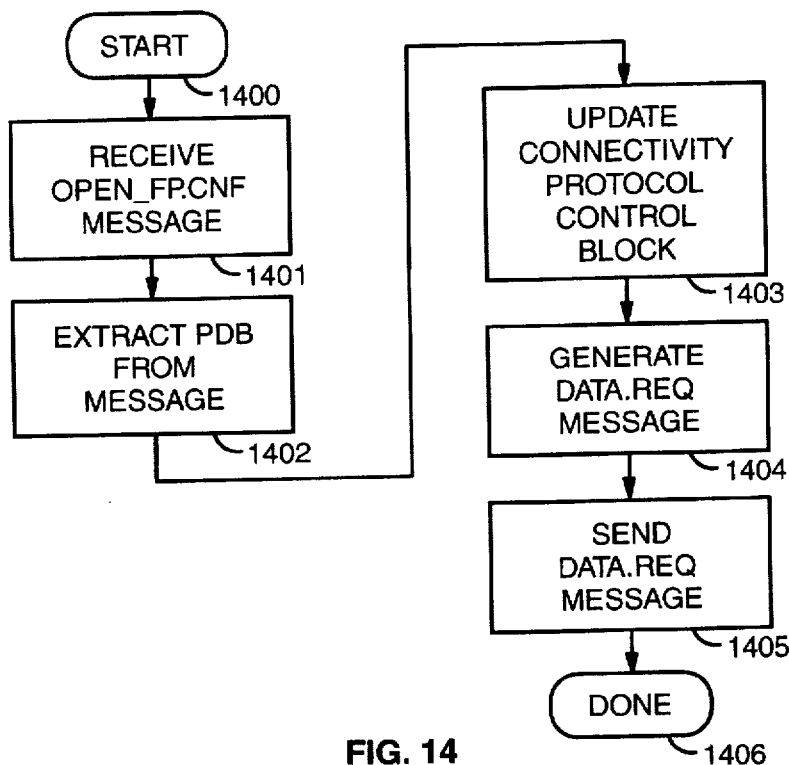
FIG. 14 shows a flow chart of the service user in the network layer entity in layer (N) receiving the call acceptance message and returning a data request message to the call originating entity.

In FIG. 14 there is shown a flow chart of the process for accepting the call setup in the peer user entity of layer (N). Starting in box 1400, box 1401 is entered to receive the OPENFP.CNF confirmation message generated in the flow chart of FIG. 13. In box 1402, the Protocol Data Block (PDB) is extracted from the OPENFP.CNF message and, in box 1403 the protocol connectivity control block is updated if the peer entity changed any of the station parameters. In box 1404, a DATA.REQ message is generated for the adjacent layer (N−1) DLC entity which contains any station parameters and call status information to be returned to the originating caller entity in the network. In box 1405, this DATA.REQ message is sent to the layer (N−1) DLC entity. The process of FIG. 14 terminates in box 1406. In FIG. 3, the layer (N) network entity 304 generates a DATA.REQ message and sends it to the layer (N−1) DLC entity 314 via SAP 310.

Figure 15:
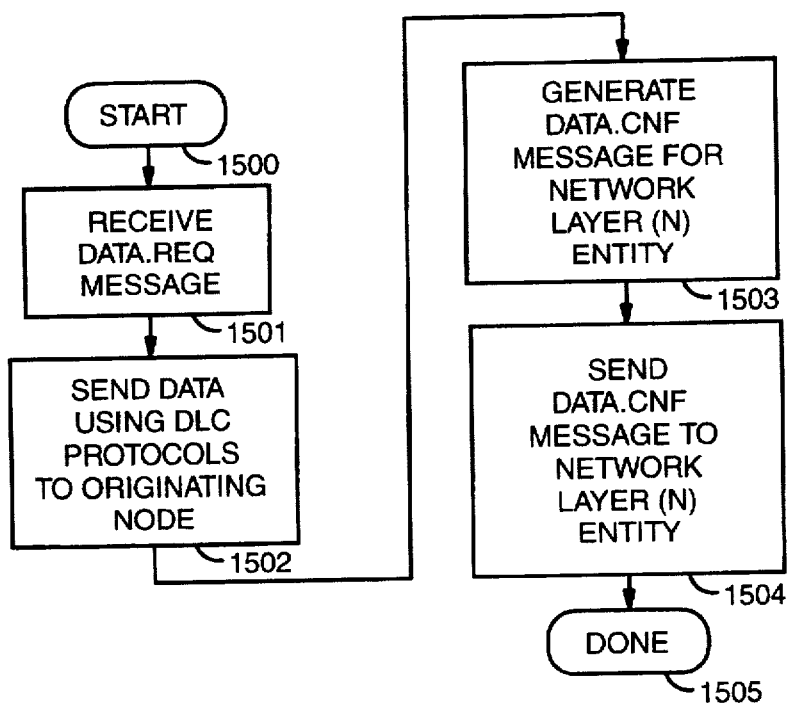
FIG. 15 shows a flow chart of the Data Link Control entity in layer (N-1) for receiving data request messages and sending them to its lower layers.

In FIG. 15, the DATA.REQ message is received and processed in the layer (N−1) DLC entity. Starting in start box 1500, box 1501 is entered to receive the DATA.REQ message and, in box 1502, using DLC protocols, to send the data block to the entity in the network that originated the call. In box 1503, a DATA.CNF message is generated and in box 1504 returned to the network entity in layer (N) to confirm reception of the data message. The process of FIG. 15 terminates in box 1505. In FIG. 3, layer (N−1) DLC entity 314 transmits the information block, via physical media 319, to the node of the network that originated the call.

Figure 16:
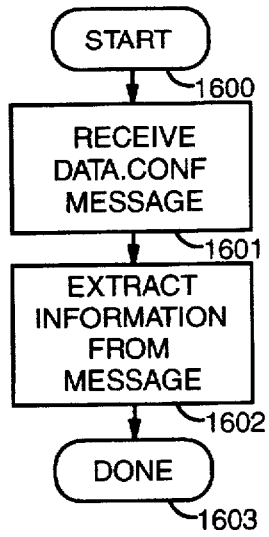
FIG. 16 shows a flow chart of the network layer entity in Layer (N) receiving confirmation that the data request message has been sent to the lower layer and hence to the network.

FIG. 16 shows this DATA.CNF message being received in the layer (N+1) network entity. Starting at box 1600, the DATA.CNF message is received in box 1601 and, in box 1602, the confirmation information is extracted from the message. The process of FIG. 16 terminates in box 1603.

Figure 17:
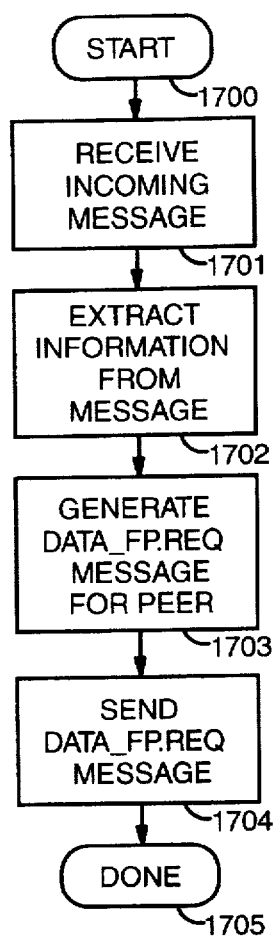
FIG. 17 shows a flow chart of a network layer entity receiving incoming data messages and forwarding them to its peer network layer entity.
Figure 18:
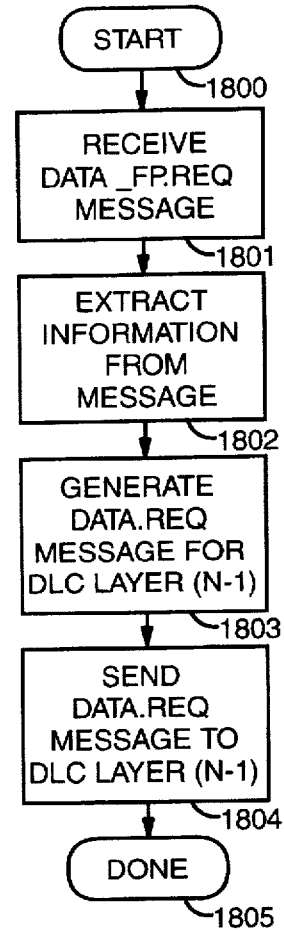
FIG. 18 shows a flow chart of a network layer entity receiving data messages from its peer network layer entity and passing these data messages on to the Data Link Control entity in the lower level.

Data can now be exchanged between the user and provides peer entities in layer (N) without involving higher layer relay entities. FIG. 17 illustrates the processing of incoming messages by one peer entity while FIG. 18 illustrates the processing of outgoing messages by the other peer entity. If the data sizes between the two networks are matched and the packet switch is matched, the data in the protocol messages can be seamlessly passed between the peer entities with little overhead to hinder performance. Even if data segmenting and resegmenting is required between the two networks, the performance of systems operating in accordance with the present invention is better than data communications using the OSI standards requiring a relay function.

In FIG. 17 there is shown the reception of a data message by one of the peer entities. Starting at box 1700, box 1701 is entered to receive the incoming data message. In box 1702, the information is extracted from the message, using segmentation of reassembly if required, and, in box 1703, a data on fast path request (DATAFP.REQ0 message is generated and, in box 1704, transmitted to the peer entity. In FIG. 3, layer (N) network entity 304 receives a message from the layer (N−1) DLC entity 314 via SAP 310, extracts the PSAP.ID which identifies the peer Service Access Point, and determines the FP.ID from the station parameters in the incoming message. The layer (N) network entity 304 then generates a DATAFP.REQ message which contains the data block from the incoming message and sends this DATAFP.REQ message via PSAP 308 to peer layer (N) network entity 306. Thus, data on fast path indication (DATAFP.IND) messages are used to flow received information from the peer provider entity 306 to the peer user entity 304.

In FIG. 18, starting at box 1800, the DATAFP.REQ message is received at the peer entity. In box 1802, the information in the message is extracted again segmenting or resegmenting if necessary, and, in box 1803, a DATA.REQ message is generated for a layer (N-1) entity to transmit the next data message to the peer entity. This DATAREQ message is sent to the layer (N-1) entity in box 1804. The process of FIG. 18 terminates in box 1805. In FIG. 3, the layer (N) network entity 306 receives the DATAFP.REQ message, forms a DATA.REQ message and sends the DATA.REQ message via SAP 312 to the layer (N-1) DLC entity 316. DLC entity 316, in turn, transmits the data message to a target entity in the packet network.

An architecture and a procedure has been disclosed for seamless direct peer-to-peer communications between peer entities in layered protocol data communications systems. The procedure requires the expansion of the definition of the Service Access Point to include Peer Service Access Points for direct communication between peer entities. Furthermore, peer entities which wish to communicate directly must include the management capability to set up and maintain the connection for the duration of the call. Such capabilities are well known in other contexts but are unique in peer-to-peer communications.

It should also be clear to those skilled in the art that further embodiments of the present invention may be made by those skilled in the art without departing from the teachings of the present invention.

What is claimed is:

1. A data transmission system having a layered communications architecture in which a service user entity in one layer of a node of said system secures services from a service provider entity in an adjacent lower level layer of said node by means of service access points through which information blocks are routed between said service user entity and said service provider entity, said system comprising:

a peer service access point for connecting any two peer entities in the same layer of said node for direct, seamless peer-to-peer communications of said information blocks between said any two entities, and means in each of said any two peer entities for setting up and maintaining communications between said any two peer entities via the peer service access point, said means for setting up and maintaining communications further comprising:

a directory services entity responsive to a request from a first one of the peer entities for identifying an address associated with a second one of the peer entities, and a directory services entity responsive to a request from a first one of the peer entities for identifying an address associated with a second one of the peer entities, and means responsive to the address identification from the directory services entity for activating the peer service access point between said first one of the peer entities and said second one of the peer entities.

2. The data transmission system according to claim 1 wherein said layered communications architecture conforms to the Open Systems Interconnection (OSI) model.

3. The data transmission system according to claim 1 wherein said layered communications architecture conforms to the Systems Network Architecture (SNA) model.

4. The data transmission system according to claim 1 further comprising means for interchanging call setup messages between said any two peer entities.

5. The data transmission system according to claim 1 further comprising a control block associated with each of said peer service access points for storing the identification of that peer service access point and for storing the identification of the two peer entities with which that peer service access point is associated.

6. The data transmission system according to claim 1 wherein one of said two peer entities first requested to provide peer-to-peer communications services is designated as said service user entity and the other one of said two peer entities is designated as said service provider entity.

7. In a data transmission system having a layered communications architecture in which a service user entity in one layer of a node of said system secures services from a service entity in an adjacent lower level layer of said node by means of service access points through which information blocks are routed between said service user entity and said service provider entity, a method comprising the steps of:

establishing a peer service access point for connecting any two peer entities in the same layer of said node for direct, seamless peer-to-peer communications of said information blocks between said any two entities, and setting up and maintaining communications between said any two peer entities by means included in each of said any two peer entities via the peer service access point, said step of setting up and maintaining communications further comprising:

requesting by a first one of the peer entities from a directory services entity an address associated with a second one of the peer entities, and responsive to the address, activating the peer service access point between said first one of the peer entities and said second one of the peer entities.

8. The method according to claim 7 further including the step of conforming said layered communications architecture to the Open Systems Interconnection (OSI) model.

9. The method according to claim 7 further including the step of conforming said layered communications architecture to the Systems Network Architecture (SNA) model.

10. The method according to claim 7 further including the step of interchanging call setup messages between said any two peer entities.

11. The method according to claim 7 further including the step of associating a control block with each of said peer service access points for storing the identification of that peer service access point and for storing the identification of the two peer entities with which that peer service access point is associated.

12. The method according to claim 7 further including the step of designating the one of said two peer entities first requested to provide peer-to-peer communications services as said service user entity and designating the other one of said two peer entities as said service provider entity.

* * * * *